US007043062B2

(12) United States Patent
Gerard et al.

(10) Patent No.: US 7,043,062 B2
(45) Date of Patent: May 9, 2006

(54) IMAGE PROCESSING METHOD FOR DISPLAYING AN IMAGE SEQUENCE OF A DEFORMABLE 3-D OBJECT WITH INDICATIONS OF THE OBJECT WALL MOTION

(75) Inventors: Olivier Gerard, Viroflay (FR); Marie Jacob, Paris (FR); Antoine Collet-Billon, Paris (FR)

(73) Assignee: Koninklijke Philips Electronics, N.V., Eindhoven (NL)

( * ) Notice: Subject to any disclaimer, the term of this patent is extended or adjusted under 35 U.S.C. 154(b) by 546 days.

(21) Appl. No.: 10/059,432

(22) Filed: Jan. 29, 2002

(65) Prior Publication Data

US 2003/0006984 A1    Jan. 9, 2003

(30) Foreign Application Priority Data

Jan. 30, 2001    (FR) .................................. 01400232

(51) Int. Cl.
G06K 9/00    (2006.01)
(52) U.S. Cl. .................... 382/128; 382/164; 378/23
(58) Field of Classification Search ................ 382/128, 382/129, 130, 131, 132, 133, 154, 162, 164, 382/169, 171, 196, 236, 237, 254, 274, 285, 382/302; 600/407, 443; 378/23, 28, 50; 703/7; 356/443; 345/424, 427; 348/43, 348/46, 254
See application file for complete search history.

(56) References Cited

U.S. PATENT DOCUMENTS 5,050,226 A * 9/1991 Collet-Billon .............. 382/261
5,540,229 A * 7/1996 Collet-Billon et al. ...... 600/443
6,295,464 B1 * 9/2001 Metaxas ..................... 600/407
6,556,695 B1 * 4/2003 Packer et al. ............... 382/128
6,714,901 B1 * 3/2004 Cotin et al. .................... 703/7
6,757,423 B1 * 6/2004 Amini ........................ 382/154

OTHER PUBLICATIONS

J. Montagnat, H. Delingette, N. Scapel and N. Ayache, "Surface Simplex Meshes For 3D Medical Image Segmentation" IEEE international conference on, vol.: 1, Apr. 24-28, 2000, pp.: 864-870 vol. 1.*
Klein et al.: "Non-rigid summing of gated PET via optical flow," Nuclear Science Symposium, 1996. Conference Record., 1996 IEEE Anaheim, CA, USA Nov. 2-9, 1996, New York, NY, USA, IEEE, US, Feb. 11, 1996, pp. 1339-1342.
Abramoff et al.: Objective quantification of the motion of soft tissues in the orbit, IEEE Transactions On Medical Imaging, Oct. 2000, IEEE, USA, vol. 19, No. 10, pp. 986-995.

* cited by examiner

Primary Examiner—Kanjibhai Patel
Assistant Examiner—Seyed Azarian

(57) ABSTRACT

Image processing method for displaying an image sequence of a deformable 3-D object with indications of the object wall motions comprising steps of acquiring image data of an image sequence, segmenting the 3-D object in the images of the sequence for locating the wall of the 3-D object, and coloring voxels or parts of the wall in function of their displacement with respect to the wall of the 3-D object in one image of the sequence chosen as a reference. Color images of the 3-D object with color coded voxels or parts of the wall are displayed in a sequence for the user to estimate the object wall motion. This method is used in medical examination apparatus for studying ultrasound images of organs whose walls have motion.

15 Claims, 3 Drawing Sheets

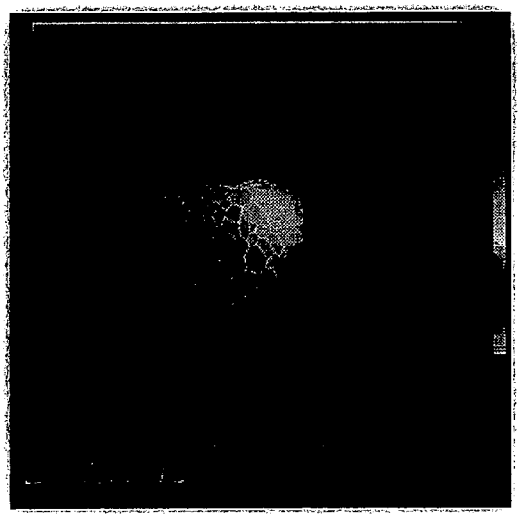 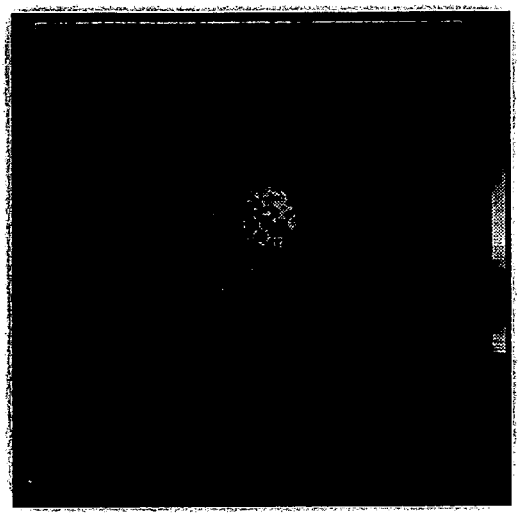
FIG.3A  FIG.3B
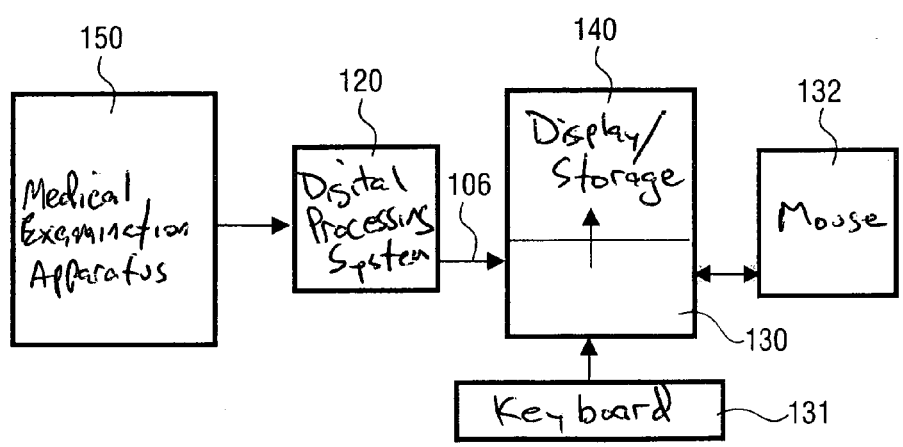
FIG.4

IMAGE PROCESSING METHOD FOR DISPLAYING AN IMAGE SEQUENCE OF A DEFORMABLE 3-D OBJECT WITH INDICATIONS OF THE OBJECT WALL MOTION

FIELD OF THE INVENTION

The invention relates to an image processing method for displaying an image sequence of a deformable 3-D object with indications of the object wall motions. In particular, the invention relates to an image processing method for processing and displaying a sequence of 3-D ultrasound images of a body organ having walls that move in the time, for providing indications of the body organ wall motions during the time of the image sequence. The invention particularly finds applications in the field of the ultrasound medical apparatus or system, for processing ultrasound 3-D image sequences produced by those apparatus or systems, in order to study or detect organ pathology from the way the organ walls move over a time delay during which a sequence of 3-D ultrasound images is registered.

BACKGROUND OF THE INVENTION

A technique of modelization of a 3-D object is already disclosed by H. Delingette in the publication entitled "Simplex Meshes: a General Representation for 3D shape Reconstruction" in the "processing of the International Conference on Computer Vision and Pattern Recognition (CVPR'94), 20–24Jun. 1994, Seattle, USA". In this paper, a physically based approach for recovering three-dimensional objects is presented. This approach is based on the geometry of "Simplex Meshes". Elastic behavior of the meshes is modeled by local stabilizing functions controlling the mean curvature through the simplex angle extracted at each vertex (node of the mesh). Those functions are viewpoint-invariant, intrinsic and scale-sensitive. Unlike deformable surfaces defined on regular grids, Simplex Meshes are very adaptive structures. A refinement process for increasing the mesh resolution at highly curved or inaccurate parts is also disclosed. Operations for connecting Simplex Meshes in order to recover complex models may be performed using parts having simpler shapes. A Simplex Mesh has constant vertex connectivity. For representing 3-D surfaces, 2-D Simplex Meshes, where each vertex is connected to three neighboring vertices, are used. The structure of a Simplex Mesh is dual to the structure of a triangulation as illustrated by the FIG. 1 of the cited publication. It can represent all types of orientable surfaces. The contour on a Simplex Mesh is defined as a closed polygonal chain consisting in neighboring vertices on the Simplex Mesh. The contour is restricted to not intersect itself. Contours are deformable models and are handled in independently of the Simplex Mesh where they are embedded. Four independent transformations are defined for achieving the whole range of possible mesh transformations. They consist in inserting or in deleting edges in a face. The description of the Simplex Mesh also comprises the definition of a Simplex Angle that generalized the angle used in planar geometry; and the definition of metric parameters that describe how the vertex is located with respect to its three neighbors. The dynamic of each vertex is given by a Newtorian law of motion. The deformation implies a force that constrains the shape to be smooth and a force that constrains the mesh to be close to the 3-D data-Internal forces determine the response of a physically based model to external constraints. The internal forces are expressed so that they be intrinsic viewpoint invariant and scale dependant. Similar types of constraints hold for contours. Hence, the cited publication provides a simple model for representing a given 3-D object. It defines the forces to be applied in order to reshape and adjust the model onto the 3-D object of interest. The "Simplex Mesh technique" is a robust segmentation method.

SUMMARY OF THE INVENTION

It is an object of the present invention to propose an image processing method for displaying quantified indications of the variations of volume of a 3-D object of interest in a coded manner, preferably in a color coded manner. The motions of the walls of the 3-D object of interest are registered in a sequence of 3-D images. Each 3-D image of the sequence represents the 3-D object of interest at a given instant. The walls of the object are divided into zones whose colors vary according to a code of colors from one image to the following image in order to permit of quantifying each zone displacement. It is particularly an object of the invention to apply this method to cardiac ventricle wall motion and especially to the left ventricle wall motion.

To this end, the invention proposes an image processing method as claimed in claim 1. This present image processing method is particularly valuable for processing a sequence of ultrasound 3-D images of the left ventricle of the heart. The invention is also related to an ultrasound medical examination apparatus having image processing means and to a program product for carrying out the method.

BRIEF DESCRIPTION OF THE DRAWINGS

The invention is described hereafter in detail in reference to the following diagrammatic drawings, wherein:

FIGS. 3A and 3B are reproductions in black and white of the images of a color coded image sequence that is displayed according to the invention;

FIG. 4 shows a diagram of an apparatus for carrying out the method.

DESCRIPTION OF THE PREFERRED EMBODIMENTS

The invention relates to an image processing method to be applied for example to a sequence of 3-D ultrasound images of the heart left ventricle. This method could also be applied to a sequence of 3-D images of other organs that can be formed by ultrasound systems or apparatus or by other systems known of those skilled in the art. The present image processing method comprises several steps:

1) Acquisition of a sequence of 3-D images of the object of interest.

Figure 1A:
FIG. 1A represents an object of interest and FIG. 1B represents a Simplex Mesh for segmenting this object using the Simplex Mesh technique.

Referring to FIG. 1A, in the present example, 3-D images of the heart left ventricle are acquired using an ultrasound examination apparatus. FIG. 1A represents one of such images. These images are assembled in a set of images in order to yield a sequence of images. In the case of the images of the left ventricle, the sequence can be acquired at a rate of 15 to 30 or 50 images per second, each image of the sequence being preferably associated to an instant of the cardiac cycle. The 3-D images of the sequence can also be acquired every month or at regular dates for the same instant of the cardiac cycle. Other examples of forming sequences of 3-D images of different organs may be found by operators of ultrasound apparatus or by doctors in order to help diagnosing diseases of moving organs or of organs whose shape or dimensions vary in the time.

2) Segmentation of the 3-D images of the sequence.

After the acquisition of the image sequence, the images are segmented. Any method of segmentation, which is able to segment the 3-D object of interest in the images of the sequence, may be used. The result of the segmentation operation permits of locating the voxels of the wall of the object of interest, for instance the wall of the heart left ventricle.

Figure 1B:
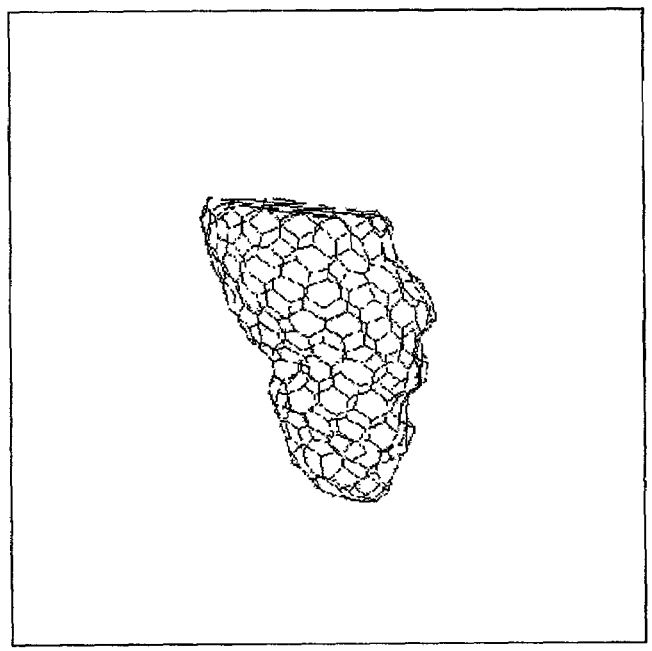

Referring to FIG. 1B, preferably, the segmentation technique of "Simplex Mesh" is used because it is robust and gives excellent results. This Simplex Mesh Technique has been previously described in relation to the publication above-cited as the state of the art. The "Simplex Mesh model" that is used is illustrated by FIG. 1B. The segmentation step consists in mapping the Simplex Mesh model onto the 3-D object of interest of FIG. 1A. This operation is performed for each image of the sequence, so that a sequence of segmented 3-D objects is formed, where the wall of the object of interest is represented by the Simplex Mesh Model with faces and edges.

3) Estimation of the displacement of the wall of the object of interest between two images of the sequence.

In the example of the heart left ventricle, at the beginning of the step, the 3-D object of interest, i. e. the heart left ventricle, is considered in one sequence image chosen as reference. For instance, the image of reference can be the one where the 3-D object of interest is the smallest or the one where it is the biggest. Other criterion can be considered according to the organ or the disease that is studied. The other images of the sequence where the left ventricle varies in shape and dimension during the cardiac cycle are further considered one by one.

Figure 2A:
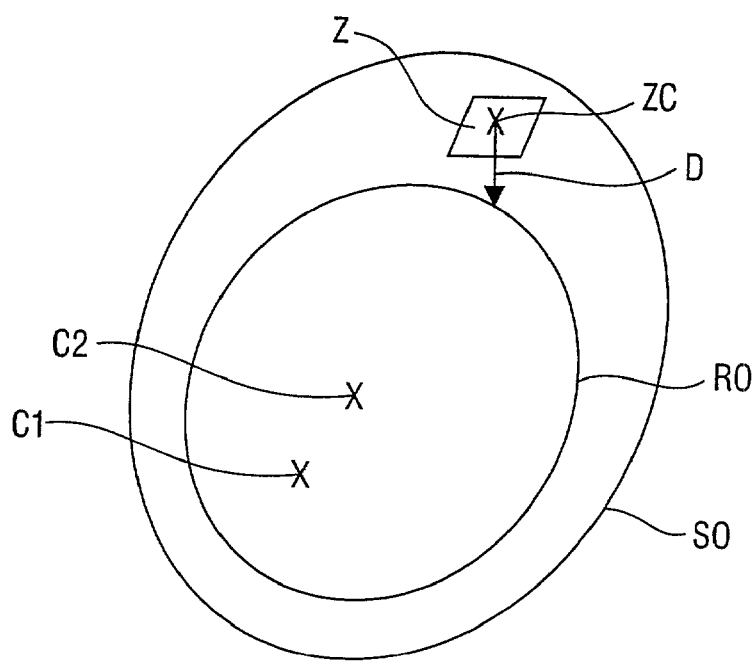
FIGS. 2A and 2B illustrate the determination of the distance variation of a given part of the object wall between two instants.
Figure 2B:
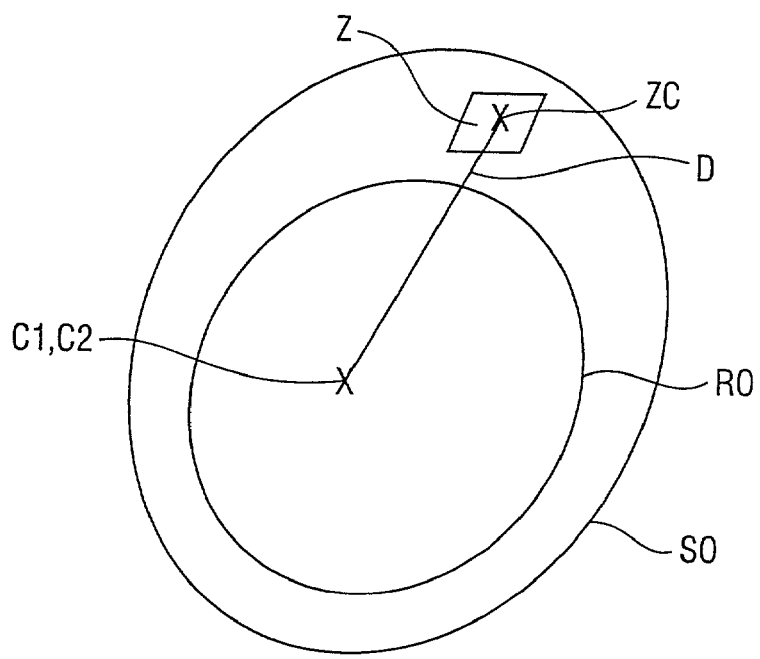

Referring to FIG. 2A and FIG. 2B, in the described example, the image of reference of the original sequence is the image of the smallest 3-D object of interest. The object of interest of the image of reference is further called 3-D object of reference denoted by RO. This 3-D object of reference is considered in the corresponding segmented image of the sequence of segmented images. This corresponding segmented image is called first image of the segmented sequence and is denoted by SO. The second image in time of the segmented sequence is compared with respect to this first segmented image.

This first segmented image SO is processed in order to transform the 3-D segmented object of reference into a binary 3-D object of reference. It is however still denoted by RO for simplicity. For instance, the voxels inside the 3-D object of reference are attributed the value 1, the voxels outside the 3-D object of reference are attributed the value 0. The boundary of the 3-D object is located between the 0 and 1 regions and represents the location of the organ wall. Other possibility for attributing a boundary to a binary object may be used as known of those skilled in the art. The 3-D object of reference RO in the first image of the segmented sequence being now a binary 3-D object of reference, the 3-D object denoted by SO is further considered in the second image of the segmented sequence.

As above-described, the segmented images can result of several possible methods of image segmentation. In each method of segmentation, there are also several possible methods for determining the wall motion between the 3-D object of the segmented image and the 3-D object of the binary image of reference.

When the 3-D object has been segmented using the Simplex Mesh model, it has faces denoted by Z. The center of gravity, denoted by ZC, is considered in one face Z. The center of gravity C1 of the binary 3-D object of reference RO of the first image and the center of gravity C2 of the segmented 3-D object SO of the second image are also considered. Now, several instances of methods are proposed for the determination of the distance between the walls of the 3-D object considered in the binary and the segmented images.

Referring to FIG. 2B, in an example, the centers of gravity of the 3-D objects of said two images may be found to be located in coincidence or not. If they are not located in coincidence, an operation of translation may be performed to superimposed those points C1, C2. The displacement of the wall at the location of the voxel of the center ZC of the face can be defined as the distance denoted by D between the boundary of the binary 3-D object of reference RO of the first image and the center ZC of the face of the segmented 3-D object of the second image measured along a line joining the center ZC of the face to the common center of gravity C1, C2 of the first and second 3-D objects RO, SO.

Referring to FIG. 2A, in an other example, the centers of gravity C1, C2 of the 3-D objects RO, SO in the first and the second images are not found to be superimposed and no operation is performed to make them coincide. A line is drawn from the center ZC of the face Z of the segmented 3-D object SO of the second image, orthogonal to this face Z. In this example, the distance D of the wall of the segmented 3-D object SO with respect to the binary 3-D object of reference RO can be defined as the measure on this line between the boundary of the binary 3-D object and the center of the face of the segmented 3-D object.

In an other example, said distance can be defined in an other way by the measure on a line joining the center ZC of the face and one of the centers C1 or C2 of the first or the second representation of the 3-D object, between the boundary of the binary 3-D object and the center ZC of the face of the segmented 3-D object.

Other numerous different definitions of said distance D are possible.

When the image sequence of 3-D objects is not segmented using the Simplex Mesh method, zones Z can be delimited on the segmented second 3-D object SO and the same methods as above-described can be applied to one zone instead of on one face.

In an other possible method of segmentation, only the voxels of the segmented object are located. In that last case, the distance D is defined between the boundaries of the binary object and the segmented object. This distance D may be defined for all the voxels, or for voxels of groups of voxels forming wall parts.

Then, the operations are repeated between the first binary 3-D object RO and the second segmented 3-D object SO for all the faces or all the zones or for boundary voxels or for voxels of wall parts as above-described.

4) Associating given colors to measured distances.

Referring to FIGS. 3A, 3B, in this step, a Table of Colors associates given colors to a measured distance D, or to a set of measured distances of a certain order. For instance, distance thresholds are determined and a color corresponding to distances between two distance thresholds is defined in order to represent the distance values of a given order. This operation is called color coding operation. There are numerous color coding techniques that may be used by those skilled in the art for performing this step. FIG. 3A represent the color coded object in shades of coded gray scale.

5) Comparing the segmented objects of the further images to an object of reference.

Regarding the whole sequence of images, either each new segmented 3-D object SO related to a new instant is compared to the first binary 3-D object of reference RO, or each new segmented 3-D object is compared to the segmented 3-D object of the last image previous in time. In that case the 3-D object of the last image previous in time with respect to said new segmented image, is considered as a 3-D object of reference RO and is processed in order to provide a binary segmented 3-D object of reference. Operations of distance calculations are performed as above-described for the first binary 3-D object of reference RO and the second segmented 3-D object of interest SO for estimating the distances D.

6) Displaying a color coded sequence of images.

In the case when the images are segmented using the Simplex Mesh method, each face of the Simplex Mesh model of each image of the segmented sequence is represented with a color, which color is a function of the distance D with respect to the chosen 3-D object of reference. Preferably, the color is provided by the Table of Colors represented by a scale of colors. Referring to FIG. 3A and FIG. 3B, this operation provides a color coded image sequence from the segmented image sequence. The sequence represented as an example by FIG. 3A, 3B has only two images. Each face or each zone Z of the model representing the object of interest is attributed a color specific of the measured displacement D, either with respect to the first 3-D object of the first image of the sequence or with respect to the 3-D object of the last previous image of the sequence. The color coded sequence is displayed for example on a screen. It may be registered or memorized.

This permits a doctor of estimating the presence or absence of pathology related to the organ whose walls have moved or changed shape along a period of time during which the image sequence has been acquired. Preferably a scale indicating the time reference is displayed together with the color coded image sequence and also indication of the color coding, for example the scale of colors in function of distance values. In the example of the left ventricle representation, it is favorable to display a curve of the cardiac pulse variation during cardiac cycles.

This method can be applied without difficulty to 2-D images, which are for instance cross-sections of the 3-D images of a 3-D object. In the case of the simplex mesh segmentation method, the 2-D segmented objects of the sequence are polygons having edges that are colored in function of their distances to the boundary of a 2-D object of reference. For a 3-D sequence of images, one might provide three orthogonal cross-section image sequences. When other segmentation methods are used, the 2-D images represent the trace of the wall of the segmented 3-D object. In these 2-D images, the wall has colored pixels or colored parts whose colors are function of their measured distances with respect to the boundary of the object of reference. The 3D or the 2D methods may be applied to ultrasound images as well as to X-ray images or to any other kind of image sequences.

Referring to FIG. 4, a medical examination apparatus 150 comprises means for acquiring a digital image sequence, and a digital processing system 120 for processing these data according to the processing method above-described. The medical examination apparatus comprises means for providing image data to the processing system 120 which has at least one output 106 to provide image data to display and/or storage means 130, 140. The display and storage means may respectively be the screen 140 and the memory 130 of a workstation 110. Said storage means may be alternately external storage means. This image processing system 120 may be a suitably programmed computer of the workstation 110, or a special purpose processor having circuit means such as LUTs, Memories, Filters, Logic Operators, that are arranged to perform the functions of the method steps according to the invention. The workstation 110 may also comprise a keyboard 131 and a mouse 132.

This medical examination apparatus 150 may be a standard ultrasonic apparatus.

The processing system 120 may use a computer program product having program instructions to be executed by the computing means of said processing system in order to carry out the above-described method.

The invention claimed is:

1. An image processing method for displaying an image sequence of a deformable 3-D object with indications of object wall motions, the method comprising the acts of:
   acquiring image data of an image sequence,
   segmenting the deformable 3-D object in images of the image sequence for locating the wall of the 3-D object, and
   coloring voxels or parts of the wall as a function of the displacement of the voxels or parts of the wall of the 3-D object in one image of the sequence chosen as a reference, wherein the displacement is measured as a predefined distance value between corresponding, voxels or parts of the wall of the 3-D segmented object in an image of the segmented sequence, and a boundary of the 3-D object of reference.

2. The image processing method of claim 1, wherein the 3-D object in the one image of the sequence chosen as a reference is processed to generate a binary object having the boundary representing the wall of the 3-D object of reference.

3. The image processing method of claim 1, wherein the wall of the 3-D object in the segmented image is represented by a set of faces, or a set of zones, linked by edges.

4. The image processing method of claim 3, wherein said predefined distance value is defined using lines extending from respective predetermined points of faces or zones, the lines used for measuring the distance between said predetermined points and the boundary of the binary 3-D object of reference.

5. The image processing method of claim 1, wherein the wall of the 3-D object wall in the segmented image is represented by voxels or by sets of voxels forming wall parts.

6. The image processing method of claim 5, wherein said predefined distance value is defined using lines extending from voxels of the wall or from predetermined voxels of parts of the wall and the boundary of the binary 3-D object of reference.

7. The image processing method of claim 1, wherein the voxels of the parts of wall or the faces or the zones of the segmented 3-D object are attributed respective colors of a color coded scale that are function of their measured distances with respect to the boundary of the 3-D object of reference.

8. The image processing method of claim 7, wherein 2-D images are formed representing cross-sections of the 3-D object of the segmented image, where the segmented object is represented with colored parts whose colors are a function of their measured distances with respect to the boundary of the 3-D object of reference.

9. The image processing method of claim 1, wherein the object of interest is the left ventricle of a heart under observation.

10. The image processing method of claim 1, wherein the color-coded 3-D object is displayed in a sequence of either 2-D or 3-D images.

11. A system comprising a suitably programmed computer or a special purpose processor having circuit means, which circuit means are arranged to process image data according to the method as claimed in claim 1.

12. An apparatus comprising:
   means to acquire medical image data,
   a system as claimed in claim 11, said system having access to said medical digital image data,
   means for processing the image data to generate processed images, and
   means to display the processed images.

13. An ultrasound examination apparatus having means for carrying out an image processing method as claimed in claim 1, the apparatus including display means for displaying an ultrasound image sequence of a deformable 3-D object with indications of the object wall motions, means for acquiring ultrasound image data of an image sequence, means for segmenting the 3-D object in the images of the sequence, means for locating the wall of the 3-D object, and means for coloring voxels or parts of the wall in function of their displacement with respect to corresponding voxels or parts of the wall of the 3-D object in one image of the sequence chosen as a reference.

14. A computer readable medium upon which may be stored a computer program comprising a set of instructions for carrying out a method as claimed in claim 1.

15. An examination apparatus for displaying an image sequence of a deformable 3-D object with indications of object wall motions, comprising:
   means for acquiring image data of the image sequence,
   means for segmenting the deformable 3-D object in images of the image sequence for locating the wall of the 3-D object, and
   means for coloring voxels or parts of the wall as a function of the displacement of the voxels or parts of the wall of the 3-D object in one image of the sequence chosen as a reference, wherein the displacement is measured as a predefined distance value between corresponding voxels or parts of the wall of the 3-D segmented object in an image of the segmented sequence, and a boundary of the 3-D object of reference.

* * * * *